(12) United States Patent
Zseng (10) Patent No.: US 10,401,577 B2
(45) Date of Patent: Sep. 3, 2019

(54) MULTI-CORE OPTICAL FIBER CONNECTION DEVICE

(71) Applicant: Molex, LLC, Lisle, IL (US)

(72) Inventor: Fan-Chen Zseng, Taipei (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/161,317

(22) Filed: Oct. 16, 2018

(65) Prior Publication Data

US 2019/0179090 A1 Jun. 13, 2019

(30) Foreign Application Priority Data

Oct. 17, 2017 (CN) .......................... 2017 2 1339268

(51) Int. Cl.
*G02B 6/38* (2006.01)

(52) U.S. Cl.
CPC ......... *G02B 6/3893* (2013.01); *G02B 6/3887* (2013.01)

(58) Field of Classification Search
CPC .. G02B 6/3825; G02B 6/3893; G02B 6/3885; G02B 6/3887; G02B 6/3897; G02B 6/38
See application file for complete search history.

(56) References Cited

U.S. PATENT DOCUMENTS

| | | | |
|---|---|---|---|
| 6,146,023 A * | 11/2000 | Weigel | G02B 6/3879 385/139 |
| 8,444,327 B2 * | 5/2013 | Chen | G02B 6/3825 385/75 |
| 9,442,258 B2 * | 9/2016 | Mougin | G02B 6/3825 |
| 9,625,655 B1 | 4/2017 | Zhu et al. | |

* cited by examiner

*Primary Examiner* — Jennifer Doan
(74) *Attorney, Agent, or Firm* — Molex, LLC (57) ABSTRACT

A multi-core optical fiber connection device comprises a first multi-core optical fiber connector and a second multi-core optical fiber connector. The first multi-core optical fiber connector comprises a first joint unit. The second multi-core optical fiber connector comprises a second joint unit. The second contact receptacle unit comprises a movable jacket and a movable ring. As long as the movable ring is pulled, the first joint unit is pushed by the movable jacket so that the first multi-core optical fiber connector and the second multi-core optical fiber connector are separated from each other, which achieves the effect that the first multi-core optical fiber connector and the second multi-core optical fiber connector are quickly connected with each other and separated from each other by one-hand operation.

6 Claims, 13 Drawing Sheets

MULTI-CORE OPTICAL FIBER CONNECTION DEVICE

RELATED APPLICATIONS

This application claims priority to Chinese Utility-Model Application No. 201721339268.3, filed on Oct. 17, 2017, which is incorporated herein by reference in its entirety.

FIELD

The present disclosure relates to a connection device, and particularly to a multi-core optical fiber connection device.

BACKGROUND

Multi-core optical fiber connection device generally comprises a multi-core optical fiber plug and a multi-core optical fiber receptacle which can be mated with each other, and for maintaining stable connection during mating, there is a latching structure between the multi-core optical fiber plug and the multi-core optical fiber receptacle to prevent the two from being detached from each other. However, the existing latching structure needs two hands of the user to operate when a user wants to remove the multi-core optical fiber plug from the multi-core optical fiber receptacle, which is inconvenient.

For example, Taiwanese PatentTWM524580 (corresponding to CN205562884U, U.S. Pat. No. 9,625,655) discloses a multi-core optical fiber receptacle and a multi-core optical fiber plug which is mated with the multi-core optical fiber receptacle, when the multi-core optical fiber plug is correspondingly inserted into the multi-core optical fiber receptacle, the connecting head inserted into the connecting hole can push the positioning member radially and outwardly, so that the connecting head can be smoothly inserted into the connecting hole, and then, the positioning member can latch to and abut against the recessed groove of the connecting head so as to quickly engage the multi-core optical fiber plug with the multi-core optical fiber receptacle. When disassembling the multi-core optical fiber plug and the multi-core optical fiber receptacle which are engaged with each other, a user should only need to apply a force to move the sleeve ring, such that the positioning member is no longer latched by the sleeve ring, in turn, the positioning member can move radially and outwardly to detach from the recessed groove, thus, the multi-core optical fiber plug is removed from the multi-core optical fiber receptacle. However, this engaged structure needs one hand to hold the multi-core optical fiber plug and the other hand to hold a multi-core optical fiber receptacle, that is, needs to use both hands to separate the multi-core optical fiber plug from the multi-core optical fiber receptacle.

SUMMARY

Therefore, an object of the present disclosure is to provide a multi-core optical fiber connection device which can be operated by one hand.

Thus, in some embodiments, a multi-core optical fiber connection device of the present disclosure comprises a first multi-core optical fiber connector and a second multi-core optical fiber connector. The first multi-core optical fiber connector comprises a first multi-core optical fiber assembly, a first joint unit and a first sleeve unit, the first joint unit and the first sleeve unit are engaged with each other to together receive the first multi-core optical fiber assembly, the first joint unit comprises a joint body, and the joint body has a connecting end portion connected with the first sleeve unit and a first engaging end portion opposite to the connecting end portion, a ring groove is formed on an outer surface of the first engaging end portion. The second multi-core optical fiber connector comprises a second multi-core optical fiber assembly, a second joint unit and a second sleeve unit, the second joint unit and the second sleeve unit are engaged with each other to together receive the second multi-core optical fiber assembly, the second joint unit comprises an outer ring connected with the second sleeve unit, an inner ring abutting against the outer ring, a movable jacket movably sheathed on an outer side of the inner ring, a fixed ring sheathed on an outer side of the inner ring and movable jacket, a movable ring movably sheathed on an outer side of the fixed ring, a first spring sheathed on the inner ring to provide an elastic bias to the movable jacket, a second spring sheathed on the fixed ring to provide an elastic bias to the movable ring and a plurality of positioning beads, the fixed ring has a second engaging end portion cooperatively mated with the first engaging end portion and a plurality of mounting holes formed to the second engaging end portion and spaced apart from each other, the plurality of mounting holes respectively receive a plurality of positioning beads and are matched with the ring groove of the first engaging end portion in position, the movable ring has a ring body spaced apart from the fixed ring and a ring protrusion protruding from an inner side of the ring body, the ring protrusion is spaced apart from an end edge of the ring body by a distance and the ring protrusion and the ring body together define a ring groove portion, and the ring protrusion has a step surface adjacent to the ring groove portion. When the first multi-core optical fiber connector and the second multi-core optical fiber connector are not mated with each other, the movable jacket is biased by the first spring to be constantly located at the inner side of the fixed ring, cover the plurality of mounting holes and press against the plurality of positioning beads so as to allow the plurality of positioning beads to protrude from an outer surface of the fixed ring, the step surface of the ring protrusion of the movable ring abuts against the plurality of positioning beads and the ring groove portion allows the plurality of positioning beads to protrude therein. When the first engaging end portion and the second engaging end portion are mated with each other, the movable jacket is pushed by the first engaging end portion to move away from the plurality of mounting holes so as to allow the plurality of positioning beads to latch to the ring groove, and the movable ring is biased by the second spring to allow the ring protrusion to move to a position where the movable ring covers the plurality of mounting holes to press against the plurality of positioning beads.

In some embodiments, the first multi-core optical fiber assembly comprises a first mating end portion, and the first mating end portion comprises a first positioning key, an inner side of the joint body of the first joint unit is formed with a first key groove cooperatively receiving the first positioning key to allow the first multi-core optical fiber assembly and the first joint unit to be positioned relative to each other, the second multi-core optical fiber assembly has a second engaging end portion, and the second engaging end portion has a second positioning key, an inner side of the inner ring of the second joint unit is form with a second key groove cooperatively receiving the second positioning key to allow the second multi-core optical fiber assembly and the second joint unit to be positioned relative to each other.

In some embodiments, the first multi-core optical fiber assembly comprises a first mating end portion, the second multi-core optical fiber assembly comprises a second mating end portion used to be mated with the first mating end portion and an inner sealing ring sheathed on the second mating end portion, and the inner sealing ring abuts against an inner side of the inner ring.

In some embodiments, the first multi-core optical fiber assembly comprises a first mating end portion, a first optical fiber cable connected with the first mating end portion and a first optical fiber insulation layer sheathed on the first optical fiber cable, the first sleeve unit comprises a first connecting tube, a first gasket, a first sealing ring and a first jacket, the first connecting tube connects the joint body and comprises a first tube body, an end of the first tube body which is connect with the first jacket is formed with a first toothed end portion, and the first sealing ring is sheathed on the first optical fiber insulation layer and is stuffed into the first toothed end portion, while the first jacket is sheathed on the first toothed end portion, the second multi-core optical fiber assembly comprises a second mating end used to be mated with the first mating end portion, a second optical fiber cable connected with the second mating end portion and a second optical fiber insulation layer sheathed on the second optical fiber cable, the second sleeve unit comprises a second connecting tube, a second gasket, a second sealing ring and a second jacket, the second connecting tube connects the outer ring and has a second tube body, one end of the second tube body which is connected with the second jacket is formed with a second toothed end portion, and the second sealing ring is sheathed on the second optical fiber insulation layer and is stuffed into the second toothed end portion, while the second jacket is sheathed on the second toothed end portion.

In some embodiments, the joint body is provided with an internal thread, and the first tube body is provided with an external thread cooperating with the internal thread to allow the joint body and the first connecting tube to be locked and fixed with each other, the outer ring is provided with an internal thread, and the second tube body is provided with an external thread cooperating with the internal thread to allow the outer ring and the second connecting tube to be locked and fixed with each other.

In some embodiments, the joint body is provided with an internal thread, the first sleeve unit comprises a first connecting tube, the first connecting tube connects the joint body and comprises a first tube body, and the first tube body is provided with an external thread cooperating with the internal thread to allow the joint body and the first connecting tube to be locked and fixed with each other, the outer ring is provided with an internal thread, the second sleeve unit comprises a second connecting tube, the second connecting tube connects the outer ring and has a second tube body and the second tube body is provided with an external thread cooperating with the internal thread to allow the outer ring and the second connecting tube to be locked and fixed with each other.

The present disclosure has the following effects: when the first multi-core optical fiber connector and the second multi-core optical fiber connector will be separated from the mated state, as long as the movable ring is pulled, the first engaging end portion is pushed by the movable jacket to allow the first engaging end portion to be removed from the second engaging end portion and in turn allow the first multi-core optical fiber connector and the second multi-core optical fiber connector to be separated from each other, which achieves the effect that the first multi-core optical fiber connector and the second multi-core optical fiber connector are quickly connected with each other and separated from each other by one-hand operation.

BRIEF DESCRIPTION OF THE FIGURES

Other features and effects of the present disclosure will be apparent from the embodiments with reference to figures, in which.

DETAILED DESCRIPTION

Figure 1:
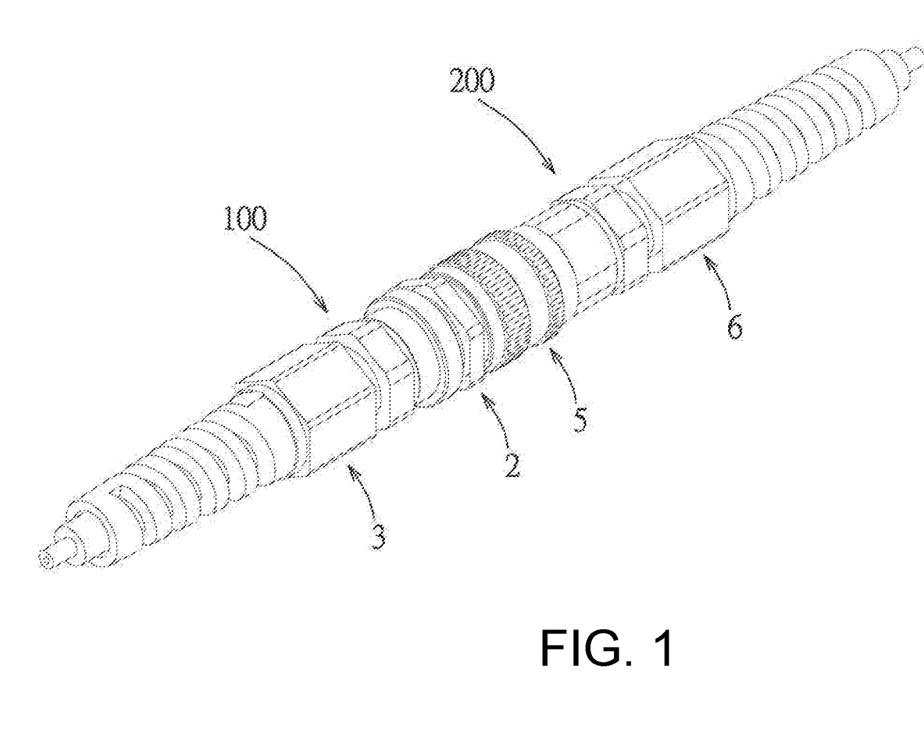
FIG. 1 is a perspective view of an embodiment of a multi-core optical fiber connection device of the present disclosure.
Figure 2:
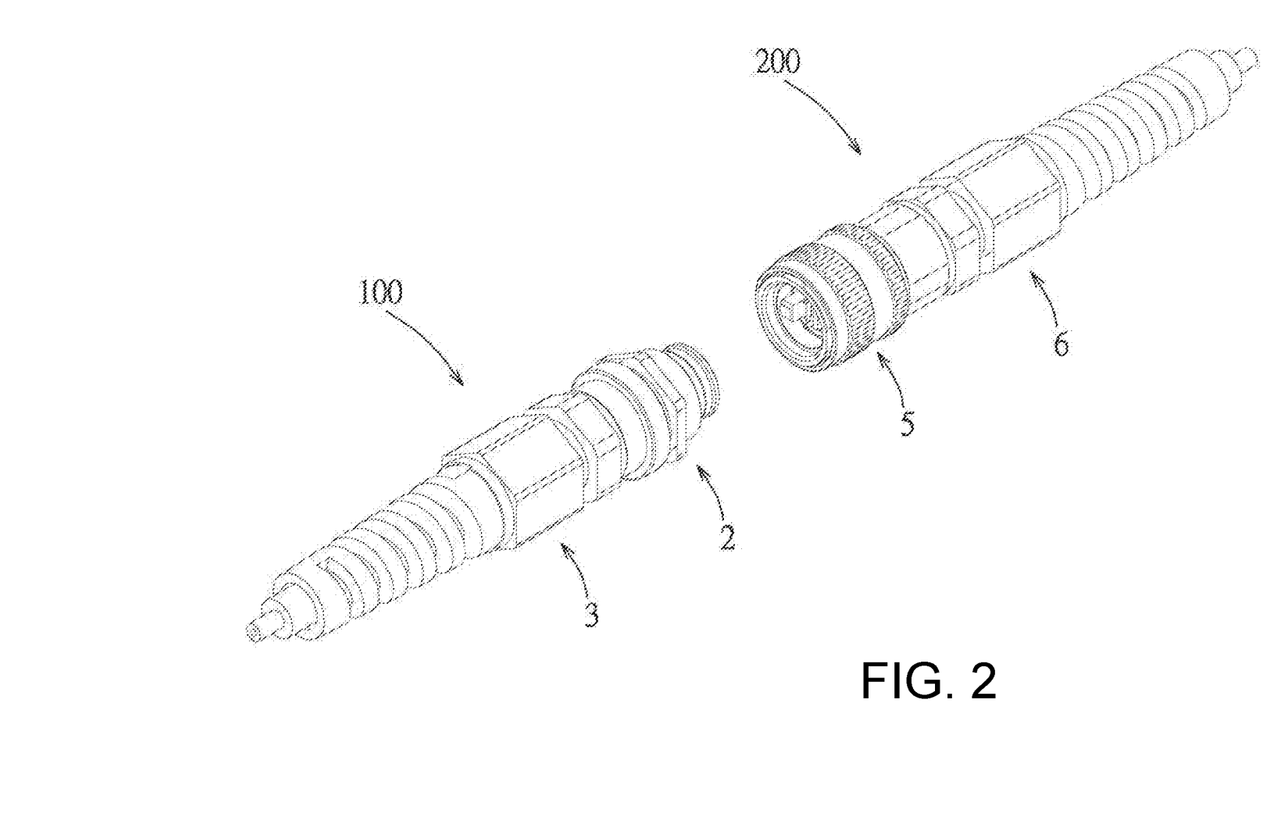
FIG. 2 is an exploded perspective view illustrating a first multi-core optical fiber connector and a second multi-core optical fiber connector of the embodiment in an unmated state.
Figure 3:
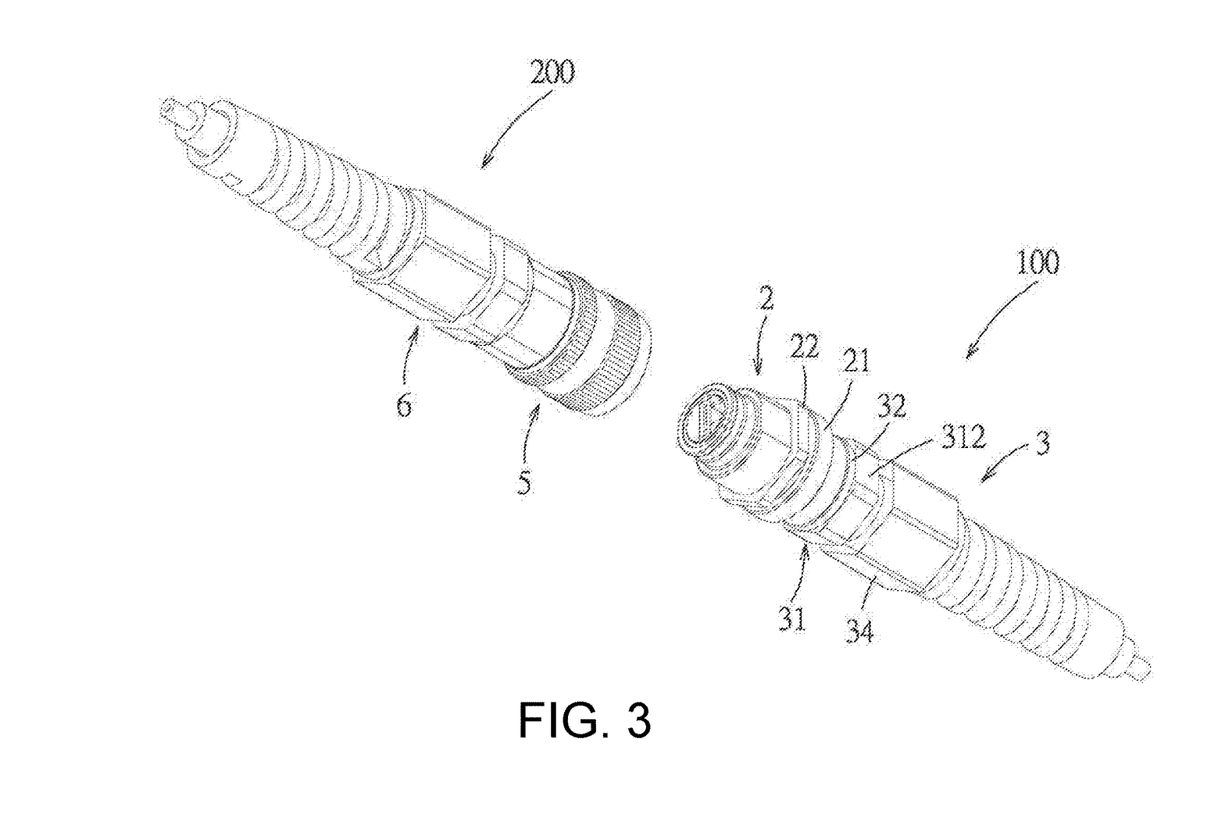
FIG. 3 is a view of FIG. 2 from another angle.
Figure 4:
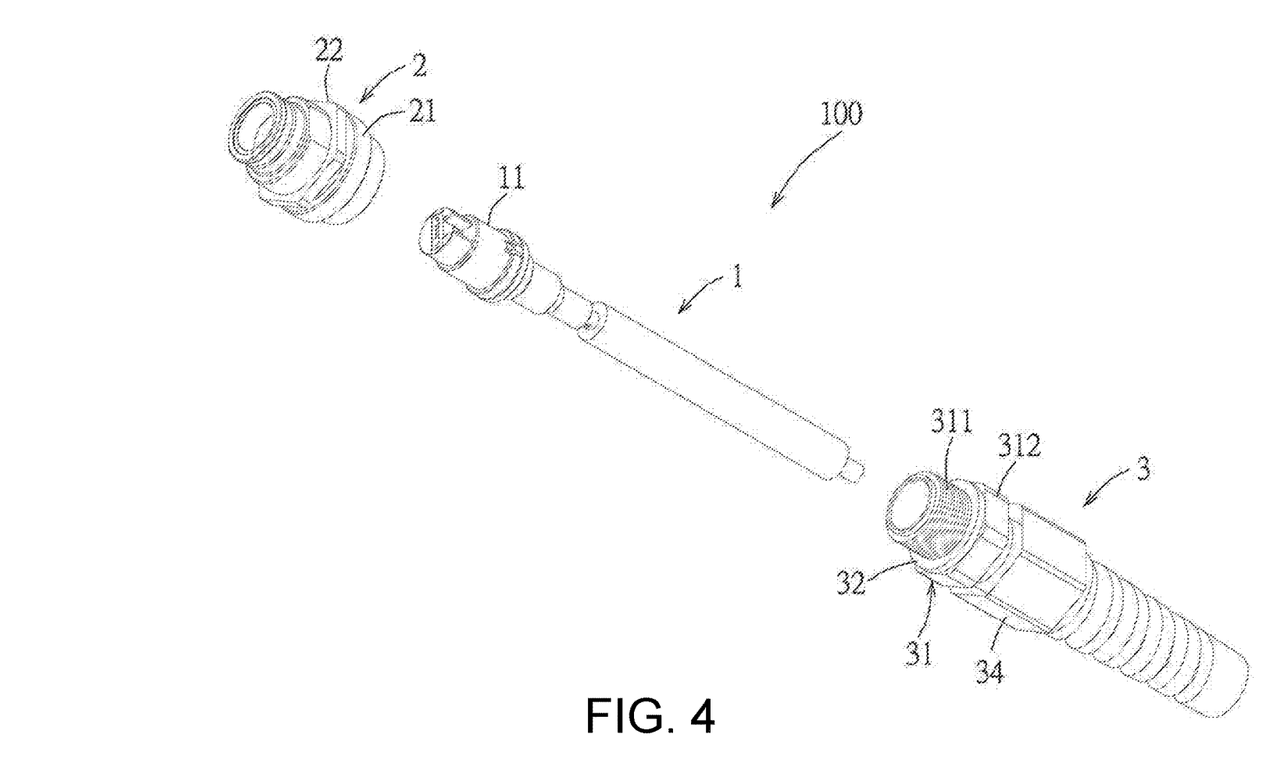
FIG. 4 is an exploded perspective view of the first multi-core optical fiber connector of the embodiment.

Referring to FIG. 1 to FIG. 3, an embodiment of a multi-core optical fiber connection device of the present disclosure comprises a first multi-core optical fiber connector 100 and a second multi-core optical fiber connector 200 which can be mated with each other.

Figure 5:
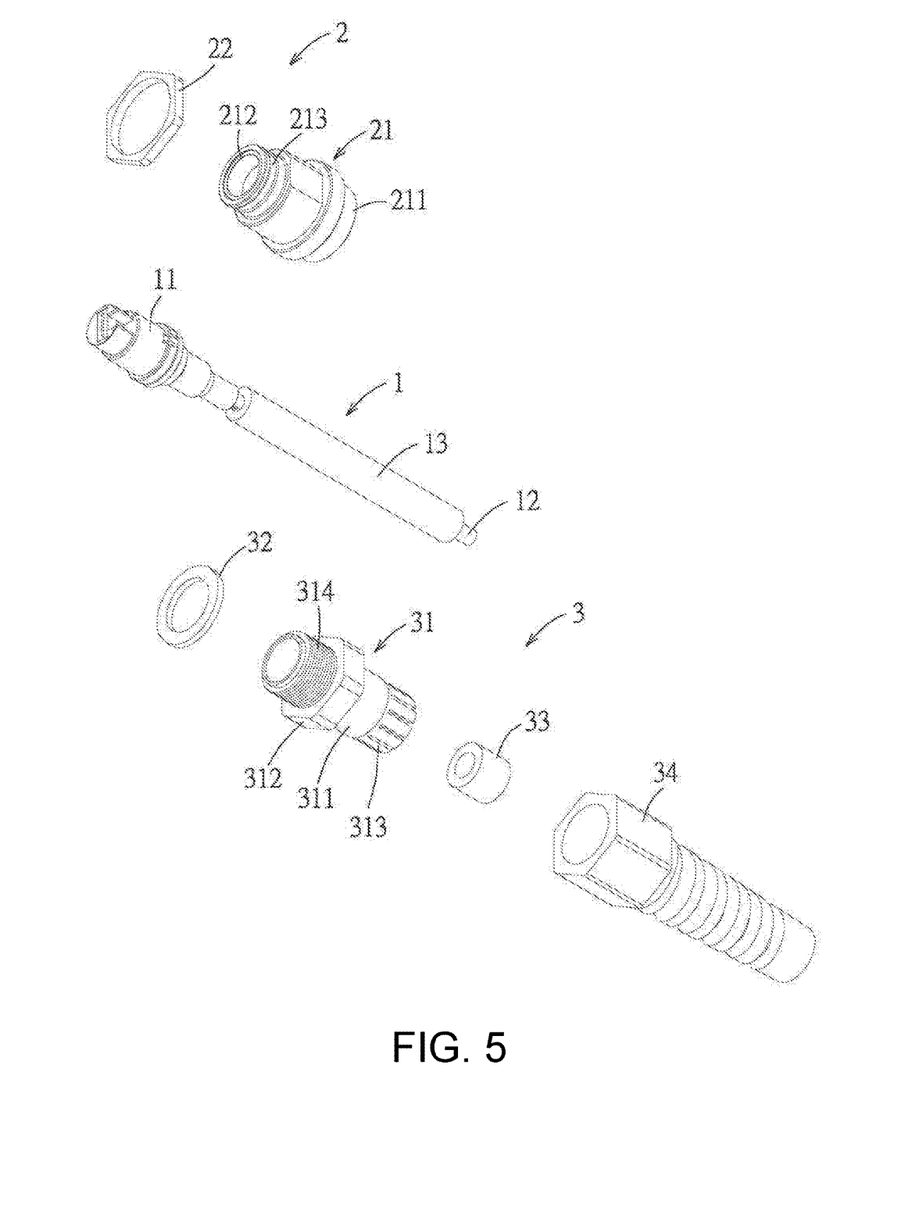
FIG. 5 is a further exploded perspective view of FIG. 4.
Figure 6:
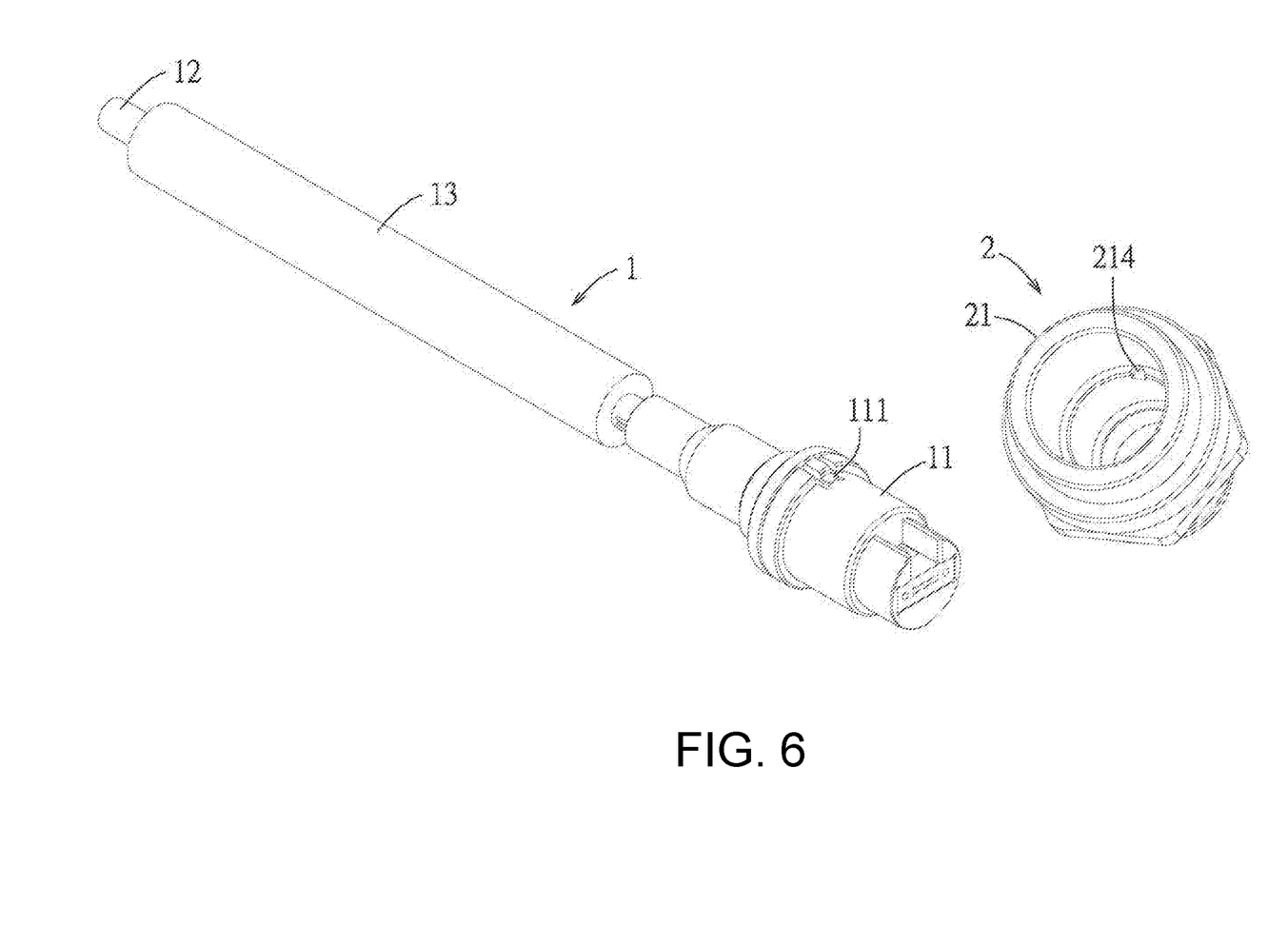
FIG. 6 is an exploded perspective view illustrating a first multi-core optical fiber assembly and a first joint unit of the embodiment.
Figure 7:
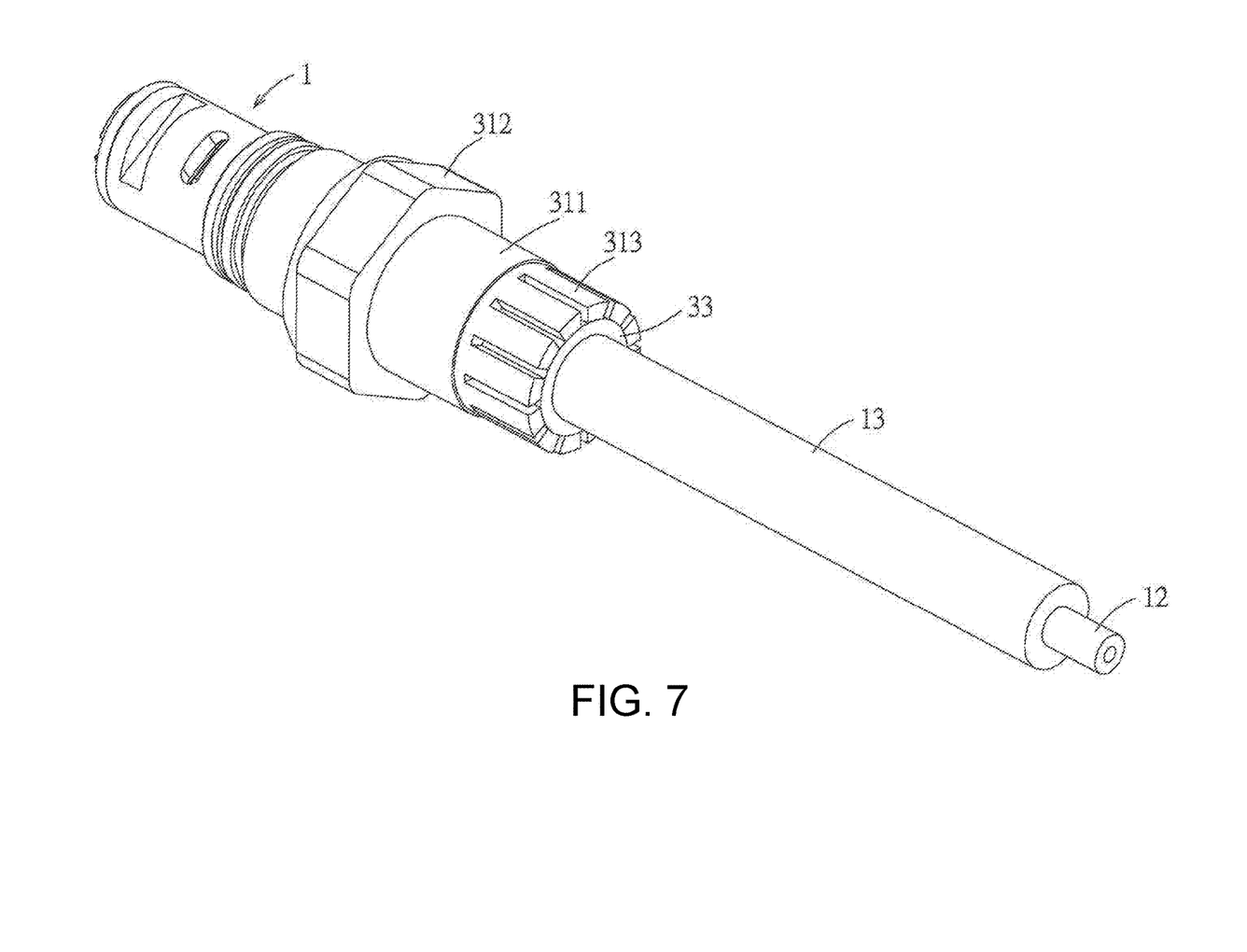
FIG. 7 is a perspective view illustrating a connecting relationship between the first multi-core optical fiber assembly and a first sleeve unit of the embodiment.
Figure 8:
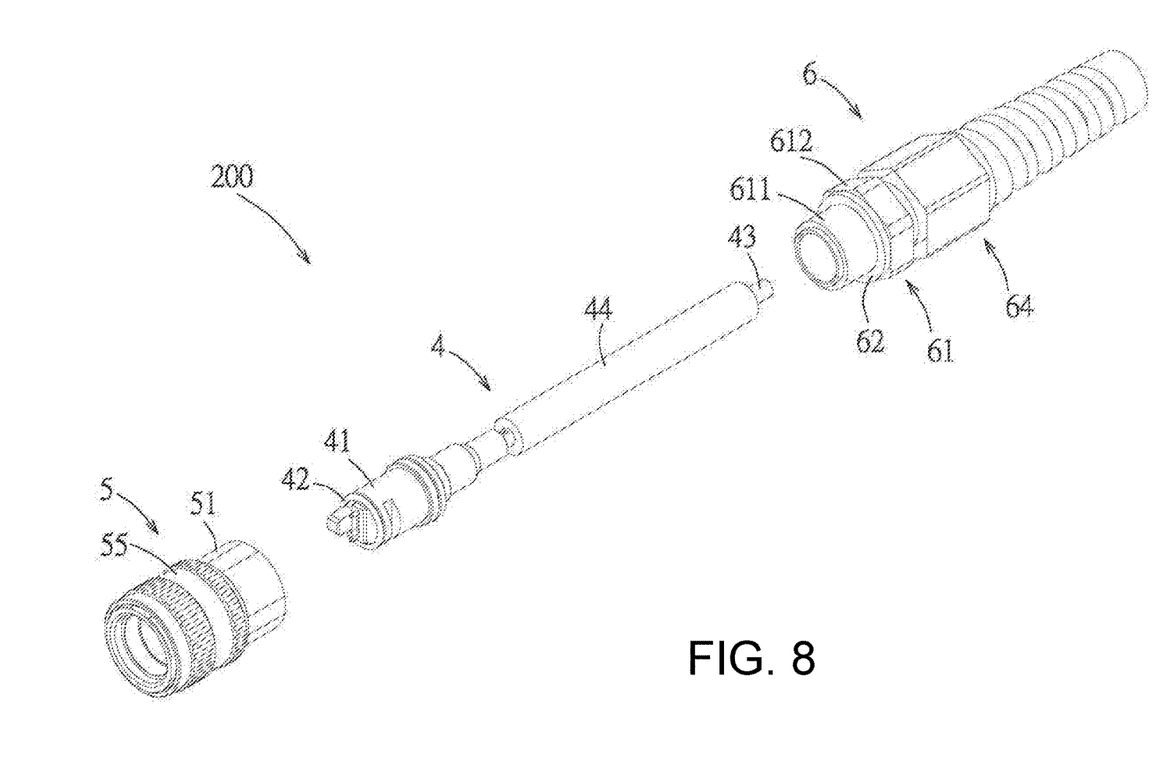
FIG. 8 is an exploded perspective view illustrating a second multi-core optical fiber connector of the embodiment.
Figure 9:
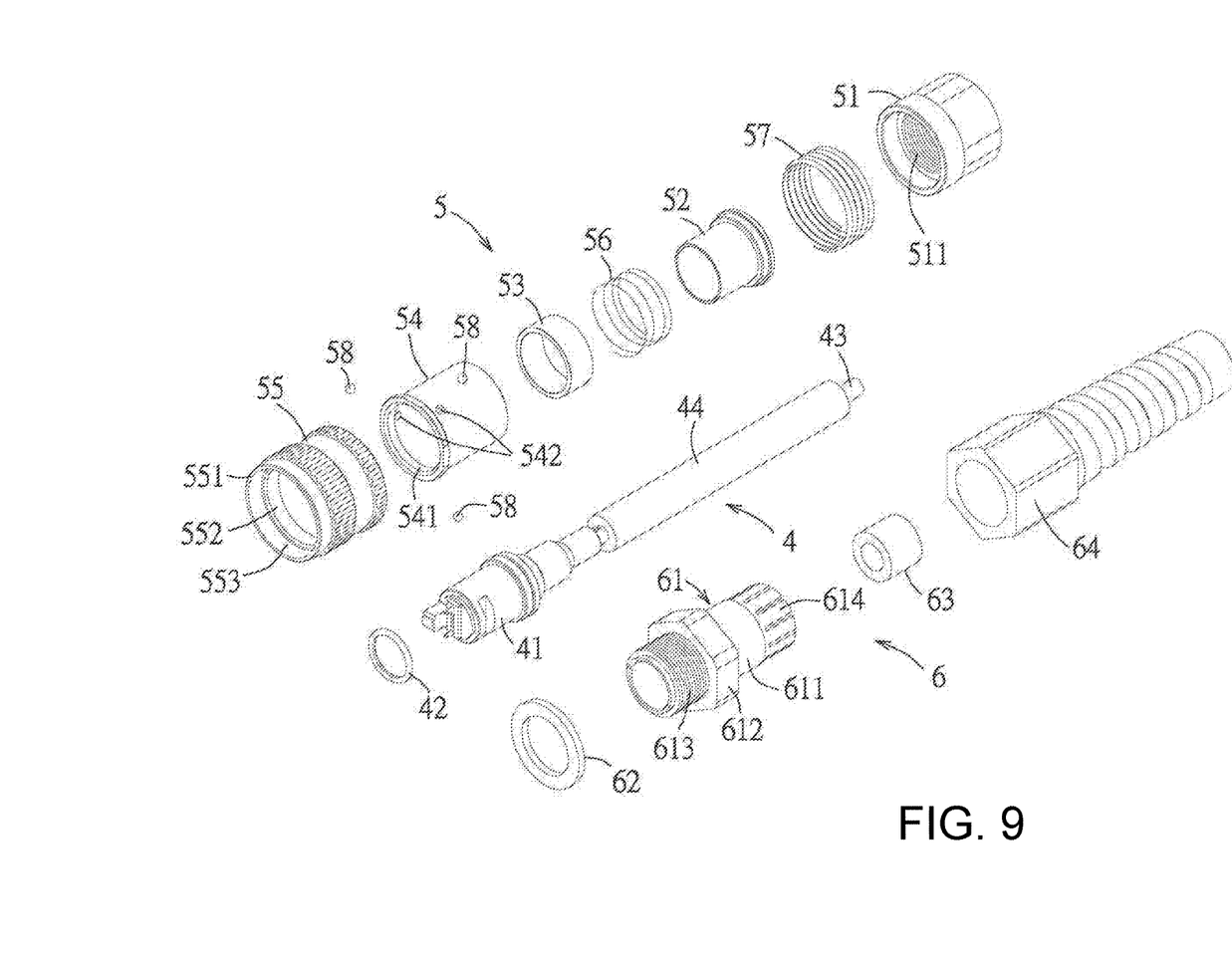
FIG. 9 is a further exploded perspective view of FIG. 8.
Figure 10:
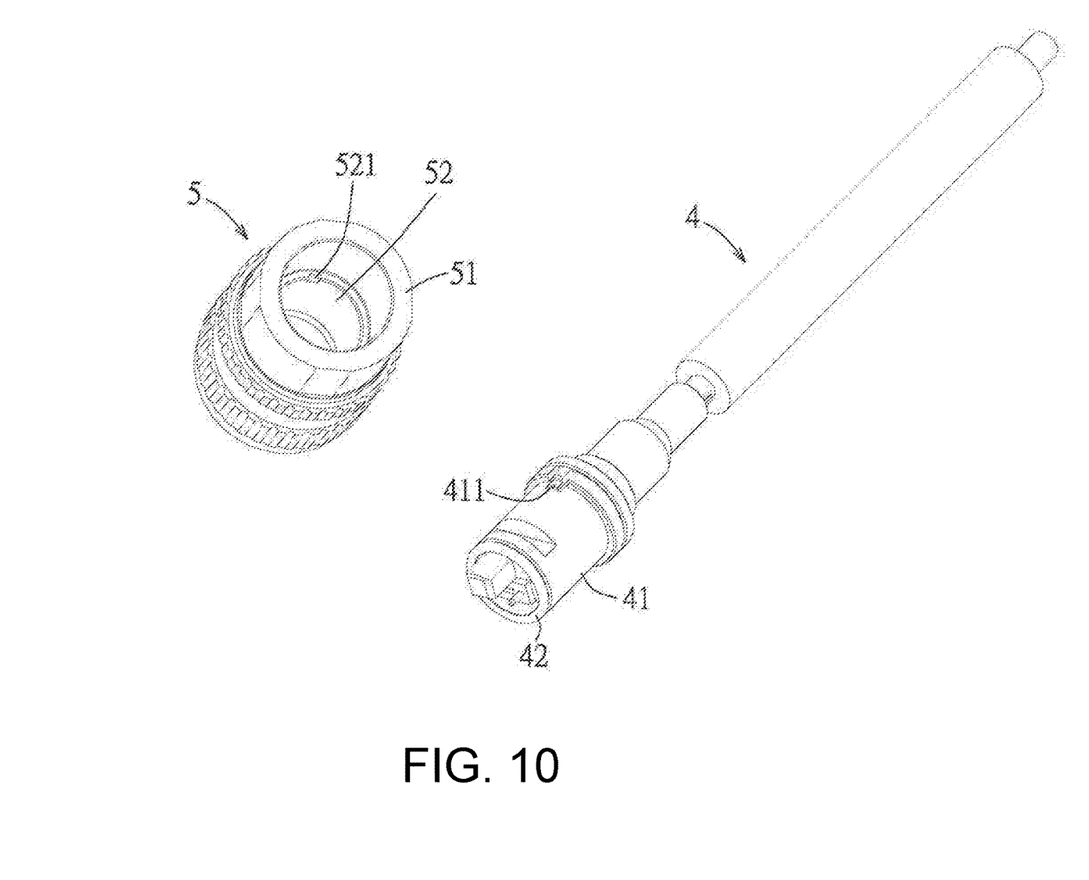
FIG. 10 is an exploded perspective view illustrating a second multi-core optical fiber assembly and a second joint unit of the embodiment.

Referring to FIG. 3 to FIG. 6, the first multi-core optical fiber connector 100 comprises a first multi-core optical fiber assembly 1, a first joint unit 2 and a first sleeve unit 3. The first joint unit 2 and the first sleeve unit 3 are engaged with each other to together receive the first multi-core optical fiber assembly 1. The first joint unit 2 comprises a joint body 21 and a fixed piece 22, and the joint body 21 has a connecting end portion 211 connected with the first sleeve unit 3 and a first engaging end portion 212 opposite to the connecting end portion 211, and a ring groove 213 is formed on an outer surface of the first engaging end portion 212. The first multi-core optical fiber assembly 1 comprise a first mating end portion 11, a first optical fiber cable 12 connected with the first mating end portion 11 and a first optical fiber insulation layer 13 sheathed on the first optical fiber cable 12, and the first mating end portion 11 comprises a first positioning key 111, an inner side of the joint body 21 of the first joint unit 2 is formed with a first key groove 214 cooperatively receiving the first positioning key 111 to allow the first multi-core optical fiber assembly 1 and the first joint unit 2 to be positioned relative to each other, that is, allow the first multi-core optical fiber assembly 1 and the first joint unit 2 not to rotate relative to each other. The first sleeve unit 3 comprises a first connecting tube 31 connecting the joint body 21, a first gasket 32, a first sealing ring 33 and a first jacket 34. The first connecting tube 31 comprises a first tube body 311 and a first protruding portion 312 protruding around the first tube body 311, in the embodiment, an outer circumference of the first protruding portion 312 has a hexagonal shape to facilitate to use a tool such as a wrench to apply a force. The first gasket 32 is sheathed on the first tube body 311 and interposed between the first protruding portion 312 and the joint body 21. In the embodiment, the joint body 21 is provided with an internal thread 215 (see FIG. 11), and the first tube body 311 is provided with an external thread 314 (see FIG. 11) cooperating with the internal thread 215 to allow the joint body 21 and the first connecting tube 31 to be locked and fixed with each other. Referring to FIG. 5 to FIG. 7, an end of the first tube body 311 which is connected with the first jacket 34 is formed with a first toothed end portion 313, and the first sealing ring 33 is sheathed on the first optical fiber insulation layer 13 and is stuffed into the first toothed end portion 313, while the first jacket 34 is sheathed on the first toothed end portion 313. A part of the first multi-core optical fiber assembly 1 is provided through the first sleeve unit 3. A gap between the first optical fiber insulation layer 13 and the first sleeve unit 3 is obstructed by the first sealing ring 33 to prevent liquid from permeating into the joint body 21, thereby preventing liquid from damaging the first multi-core fiber assembly 1.

Referring to FIG. 8 to FIG. 11, the second multi-core optical fiber connector 200 comprises a second multi-core optical fiber assembly 4, a second joint unit 5 and a second sleeve unit 6, the second joint unit 5 and the second sleeve unit 6 are engaged with to together receive the second multi-core optical fiber assembly 4. The second joint unit 5 comprises an outer ring 51 connected with the second sleeve unit 6, an inner ring 52 abutting against the outer ring 51, a movable jacket 53 movably sheathed on an outer side of the inner ring 52, a fixed ring 54 sheathed on an outer side of the inner ring 52 and movable jacket 53, a movable ring 55 movably sheathed on an outer side of the fixed ring 54, a first spring 56 sheathed on the inner ring 52 to provide an elastic bias to the movable jacket 53, a second spring 57 sheathed on the fixed ring 54 to provide an elastic bias to the movable ring 55 and a plurality of positioning beads 58. The fixed ring 54 has a second engaging end portion 541 cooperatively mated with the first engaging end portion 212 and a plurality of mounting holes 542 formed to the second engaging end portion 541 and spaced apart from each other. The plurality of mounting holes 542 respectively receive the plurality of positioning beads 58 and are matched with the ring groove 213 of the first engaging end portion 212 in position. The movable ring 55 has a ring body 551 spaced apart from the fixed ring 54 and a ring protrusion 552 protruding from an inner side of the ring body 551, the ring protrusion 552 is spaced apart from an end edge of the ring body 551 by a distance and the ring protrusion 552 and the ring body 551 together define a ring groove portion 553, and the ring protrusion 552 has a step surface 552a adjacent to the ring groove portion 553. The second multi-core optical fiber assembly 4 comprises a second mating end portion 41 used to be mated with the first mating end portion 11, a second optical fiber cable 43 connected with the second mating end portion 41 and a second optical fiber insulation layer 44 sheathed on the second optical fiber cable 43, and the second mating end portion 41 has a second positioning key 411, an inner side of the inner ring 52 of the second joint unit 5 is formed with a second key groove 521 cooperatively receiving the second positioning key 411 to allow the second multi-core optical fiber assembly 4 and the second joint unit 5 to be positioned relative to each other. The second sleeve unit 6 comprises a second connecting tube 61 connecting the outer ring 51, a second gasket 62, a second sealing ring 63 and a second jacket 64. The second connecting tube 61 has a second tube body 611 and a second protruding portion 612 protruding around the second tube body 611. The outer ring 51 is provided with an internal thread 511, and the second tube body 611 is provided with an external thread 613 cooperating with the internal thread 511 to allow the outer ring 51 and the second connecting tube 61 to be locked and fixed with each other. One end of the second tube body 611 which is connected with the second jacket 64 is formed with a second toothed end portion 614, and the second sealing ring 63 is sheathed on the second optical fiber insulation layer 44 and is stuffed into the second toothed end portion 614, while the second jacket 64 is sheathed on the second toothed end portion 614. A part of the second multi-core optical fiber assembly 4 is provided through the second sleeve unit 6. A gap between the second optical fiber insulation layer 44 and the second sleeve unit 6 is obstructed by the second sealing ring 63 to prevent liquid from permeating into the second joint unit 5, thereby preventing liquid from damaging the second multi-core optical fiber assembly 4. The second multi-core optical fiber assembly 4 further comprises an inner sealing ring 42 sheathed on an end edge of the second mating end portion 41, and the inner sealing ring 42 abuts against an inner side of an end edge of the inner ring 52, and is used to abut against the first engaging end portion 212 when the first multi-core optical fiber connector 100 is mated with the second multi-core optical fiber connector 200 (see FIG. 13), so as to prevent liquid from permeating into the mating interface between the first multi-core optical fiber assembly 1 and the second multi-core optical fiber assembly 4.

Figure 11:
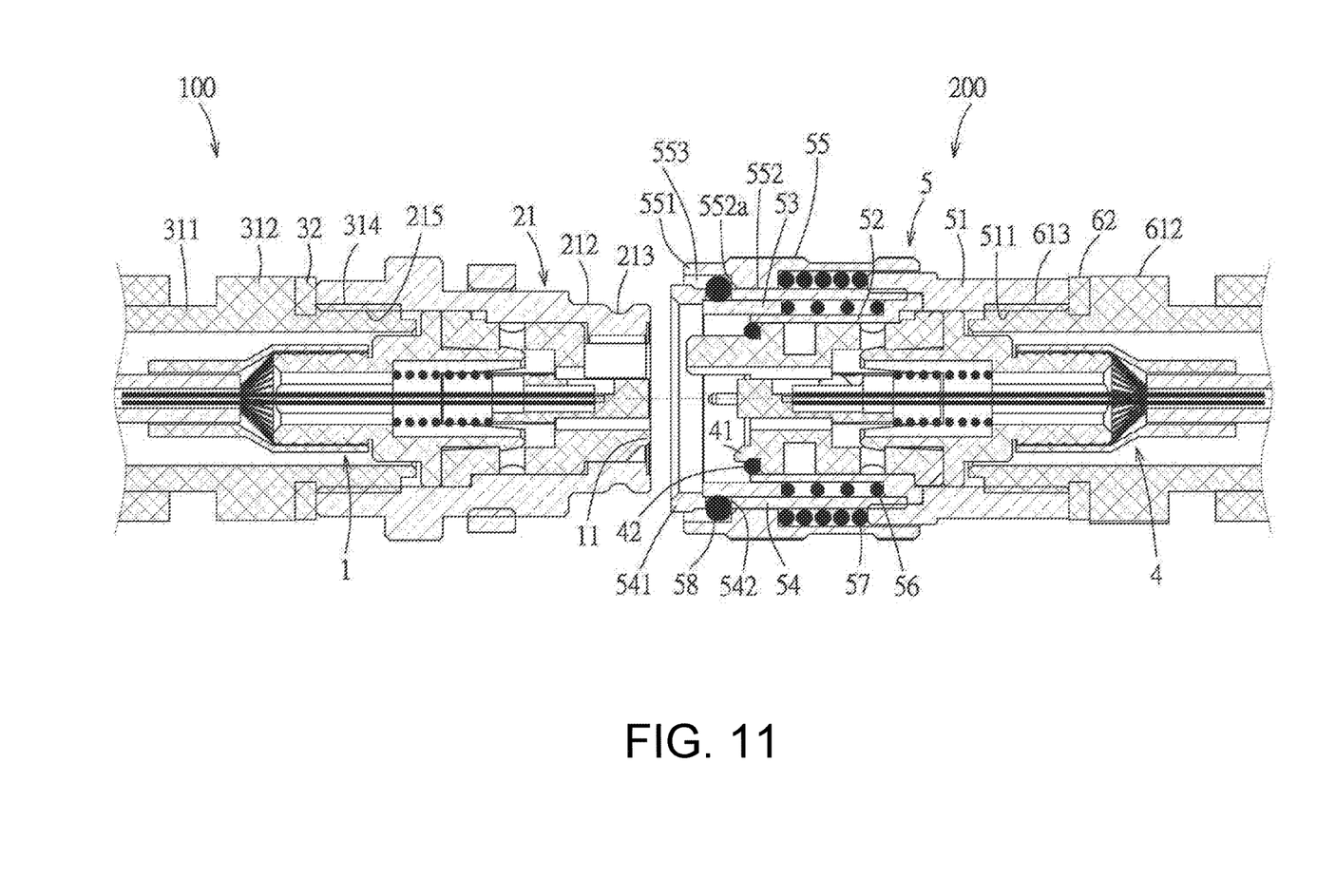
FIG. 11 is a partial cross sectional view illustrating the first multi-core optical fiber connector and the second multi-core optical fiber connector of the embodiment in an unmated state.
Figure 12:
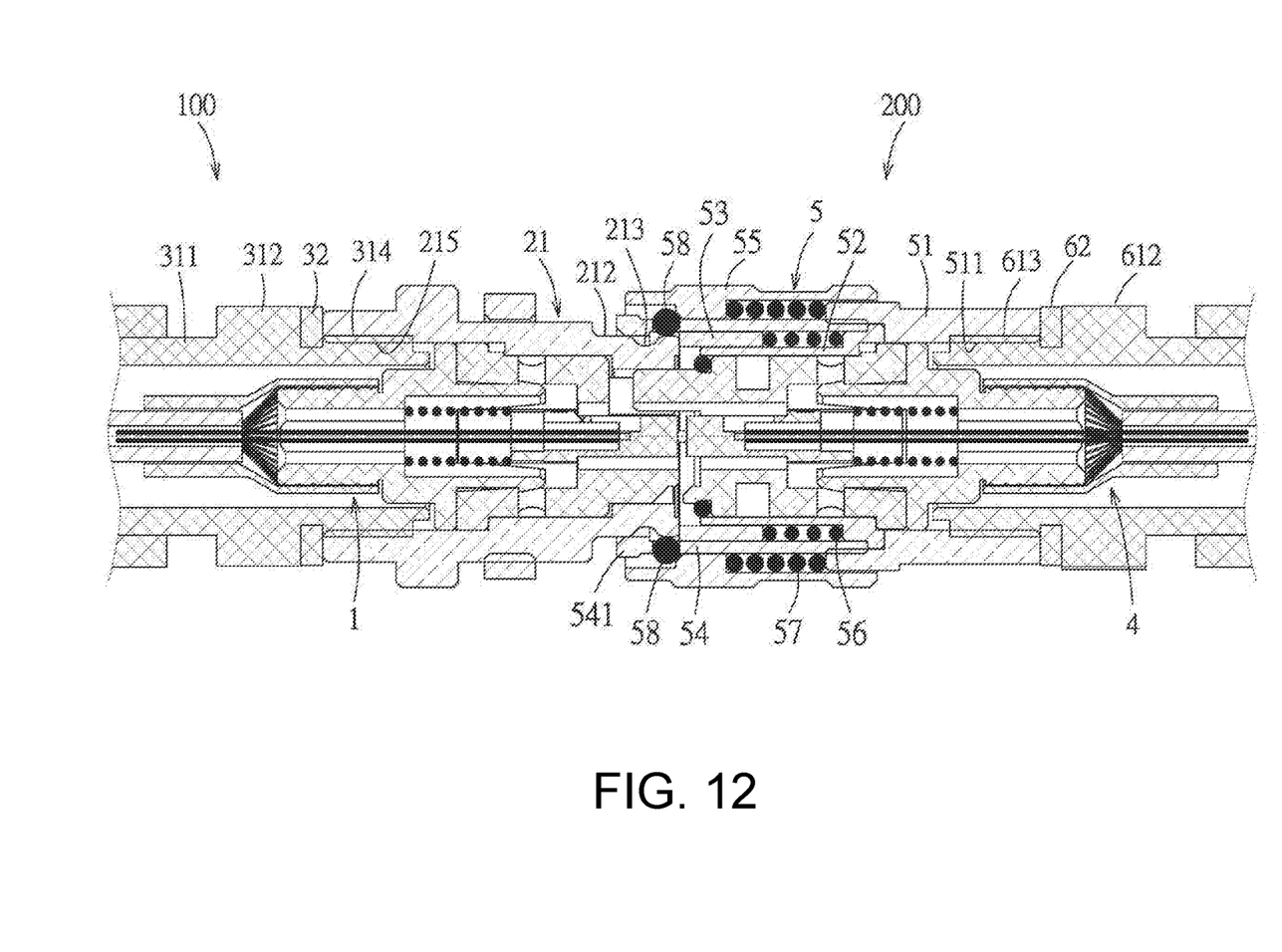
FIG. 12 is a partial cross sectional view illustrating the first multi-core optical fiber connector and the second multi-core optical fiber connector of the embodiment in a mating state.
Figure 13:
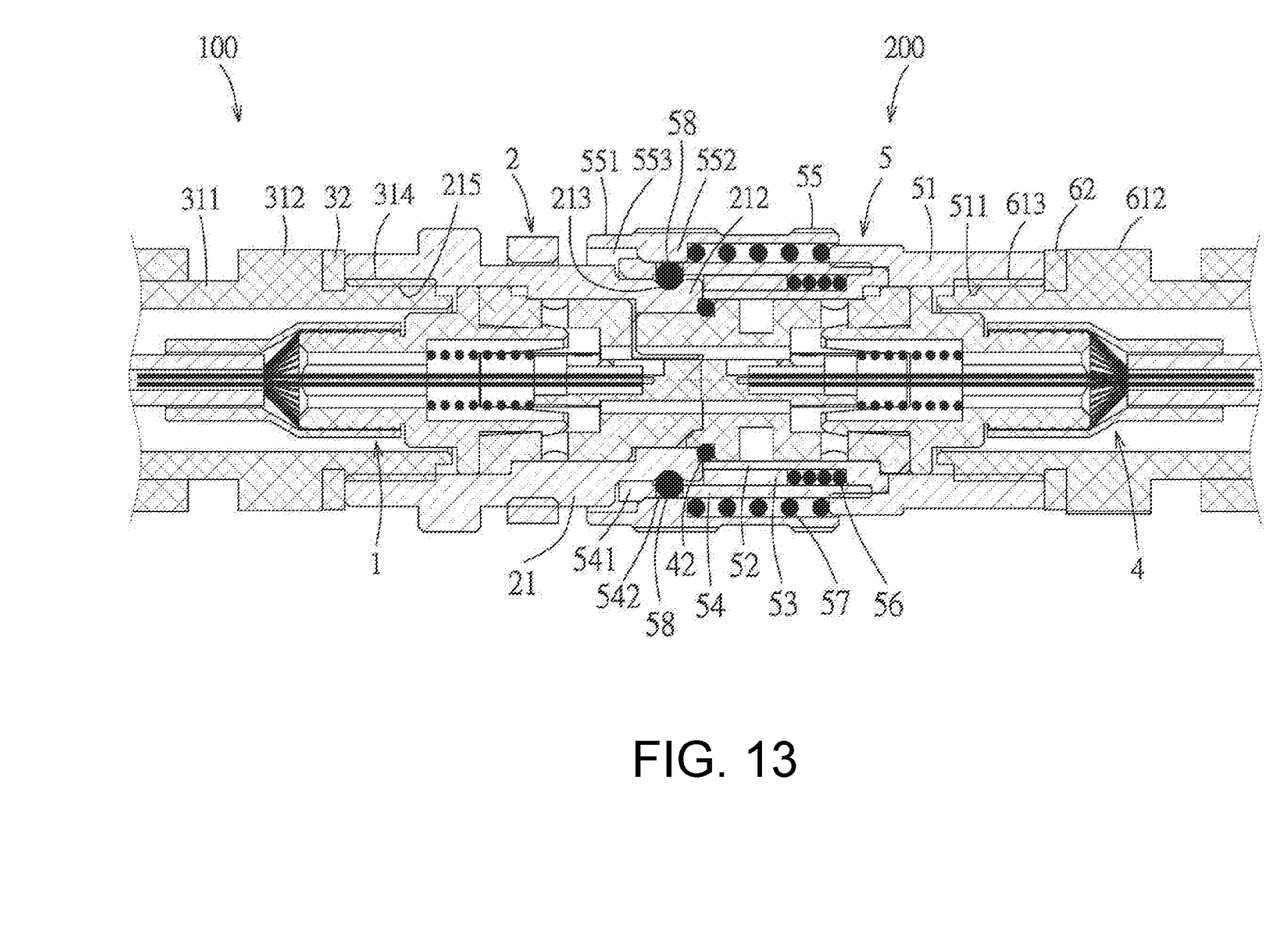
FIG. 13 is a partial cross sectional view illustrating the first multi-core optical fiber connector and second multi-core optical fiber connector of the embodiment in a mated state.

Referring to FIG. 11 to FIG. 13, when the first multi-core optical fiber connector 100 the second multi-core optical fiber connector 200 are not mated with each other, that is, when the first engaging end portion 212 and the second engaging end portion 541 are not mated with each other, the movable jacket 53 is biased by the first spring 56 to be constantly located at the inner side of the fixed ring 54, cover the plurality of mounting holes 542 and press against the plurality of positioning beads 58 so as to allow the plurality of positioning beads 58 to protrude from an outer surface of the fixed ring 54, the step surface 552a of the ring protrusion 552 of the movable ring 55 abuts against the plurality of positioning beads 58 and the ring groove portion 553 allow the plurality of positioning beads 58 to protrude therein. When the first engaging end portion 212 and the second engaging end portion 541 are mated with each other, the movable jacket 53 is pushed by the first engaging end portion 212 to move away from the plurality of mounting holes 542 so as to allow the plurality of positioning beads 58 to latch to the ring groove 213, and the movable ring 55 is biased by the second spring 57 to allow the ring protrusion 552 to move to a position where the movable ring 55 covers the plurality of mounting holes 542 to press against the plurality of positioning beads 58, the first multi-core optical fiber connector 100 and the second multi-core optical fiber connector 200 are fixed relative to each other to maintain a stable connection by the plurality of the positioning beads 58 latching to the ring grooves 213. When the first multi-core optical fiber connector 100 and the second multi-core optical fiber connector 200 are separated, it needs only one hand to pull the movable ring 55 so as to allow the ring protrusion 552 to move away from the plurality of positioning beads 58 to release the pressing against the plurality of positioning beads 58 and allow the plurality of positioning beads 58 can move toward the ring groove portion 553, at the same time, the movable jacket 53 returns toward the original position by the first spring 56 and the first engaging end portion 212 is pushed by the movable jacket 53 and the first spring 56 together during the movement of them, so that the first engaging end portion 212 is removed from the second engaging end portion 541, in this way, the first multi-core optical fiber connector 100 and the second multi-core fiber optic connector 200 can be separated from each other. While the movable jacket 53 pushes the first engaging end portion 212, the movable jacket 53 also pushes the plurality of positioning beads 58 toward the ring groove portion 553, finally the movable jacket 53 presses against the plurality of positioning beads 58 from the inner side of the fixed ring 54 to allow the plurality of positioning beads 58 to protrude from the outer surface of the fixed ring 54 and allow the ring protrusion 552 to abut against the plurality of positioning beads 58, so that the ring protrusion 552 can compress the second spring 57, in turn, when the first multi-core optical fiber connector 100 and the second multi-core optical fiber connector 200 are mated with each other, the ring protrusion 552 returns to the position where the ring protrusion 552 presses against the plurality of positioning beads 58 by the elasticity of the second spring 57.

In conclusion, when the first multi-core optical fiber connector 100 and the second multi-core optical fiber connector 200 will be separated from the mated state, as long as the movable ring 55 is pulled, the first engaging end portion 212 is pushed by the movable jacket 53 to allow the first engaging end portion 212 to be removed from the second engaging end portion 541 and in turn allow the first multi-core optical fiber connector 100 and the second multi-core optical fiber connector 200 to be separated from each other, which achieves the effect that the first multi-core optical fiber connector 100 and the second multi-core optical fiber connector 200 are quickly connected with each other and separated from each other by one-hand operation.

However, the above description is only for the embodiments of the present disclosure, and the scope of the present disclosure is not limited thereto, and all the simple equivalent changes and modifications according to the scope of the claims and the specification of the present disclosure are still within the scope of the claims of the present disclosure.

The invention claimed is:

1. A multi-core optical fiber connection device, comprising:
    a first multi-core optical fiber connector, comprising a first multi-core optical fiber assembly, a first joint unit and a first sleeve unit, the first joint unit and the first sleeve unit being engaged with each other to together receive the first multi-core optical fiber assembly, the first joint unit comprising a joint body, and the joint body having a connecting end portion connected with the first sleeve unit and a first engaging end portion opposite to the connecting end portion, a ring groove being formed on an outer surface of the first engaging end portion, and a second multi-core optical fiber connector, comprising a second multi-core optical fiber assembly, a second joint unit and a second sleeve unit, the second joint unit and the second sleeve unit being engaged with each other to together receive the second multi-core optical fiber assembly, the second joint unit comprising an outer ring connected with the second sleeve unit, an inner ring abutting against the outer ring, a movable jacket movably sheathed on an outer side of the inner ring, a fixed ring sheathed on an outer side of the inner ring and movable jacket, a movable ring movably sheathed on an outer side of the fixed ring, a first spring sheathed on the inner ring to provide an elastic bias to the movable jacket, a second spring sheathed on the fixed ring to provide an elastic bias to the movable ring and a plurality of positioning beads, the fixed ring having a second engaging end portion cooperatively mated with the first engaging end portion and a plurality of mounting holes formed to the second engaging end portion and spaced apart from each other, the plurality of mounting holes respectively receiving a plurality of positioning beads and being matched with the ring groove of the first engaging end portion in position, the movable ring having a ring body spaced apart from the fixed ring and a ring protrusion protruding from an inner side of the ring body, the ring protrusion being spaced apart from an end edge of the ring body by a distance and the ring protrusion and the ring body together defining a ring groove portion, and the ring protrusion having a step surface adjacent to the ring groove portion;

when the first multi-core optical fiber connector and the second multi-core optical fiber connector are not mated with each other, the movable jacket being biased by the first spring to be constantly located at the inner side of the fixed ring, cover the plurality of mounting holes and press against the plurality of positioning beads so as to allow the plurality of positioning beads to protrude from an outer surface of the fixed ring, the step surface of the ring protrusion of the movable ring abutting against the plurality of positioning beads and the ring groove portion allowing the plurality of positioning beads to protrude therein;

when the first engaging end portion and the second engaging end portion are mated with each other, the movable jacket being pushed by the first engaging end portion to move away from the plurality of mounting holes so as to allow the plurality of positioning beads to latch to the ring groove, and the movable ring being biased by the second spring to allow the ring protrusion to move to a position where the movable ring covers the plurality of mounting holes to press against the plurality of positioning beads.

2. The multi-core optical fiber connection device of claim 1, wherein
    the first multi-core optical fiber assembly comprises a first mating end portion, and the first mating end portion comprises a first positioning key, an inner side of the joint body of the first joint unit is formed with a first key groove cooperatively receiving the first positioning key to allow the first multi-core optical fiber assembly and the first joint unit to be positioned relative to each other,
    the fixed ring has a second engaging end portion, and the second engaging end portion has a second positioning key, an inner side of the inner ring of the second joint unit is form with a second key groove cooperatively receiving the second positioning key to allow the second multi-core optical fiber assembly and the second joint unit to be positioned relative to each other.

3. The multi-core optical fiber connection device of claim 1, wherein
the first multi-core optical fiber assembly comprises a first mating end portion,
the second multi-core optical fiber assembly comprises a second mating end portion used to be mated with the first mating end portion and an inner sealing ring sheathed on the second mating end portion, and the inner sealing ring abuts against an inner side of the inner ring.

4. The multi-core optical fiber connection device of claim 1, wherein
the first multi-core optical fiber assembly comprises a first mating end portion, a first optical fiber cable connected with the first mating end portion and a first optical fiber insulation layer sheathed on the first optical fiber cable,
the first sleeve unit comprises a first connecting tube, a first gasket, a first sealing ring and a first jacket, the first connecting tube connects the joint body and comprises a first tube body, an end of the first tube body which is connect with the first jacket is formed with a first toothed end portion, and the first sealing ring is sheathed on the first optical fiber insulation layer and is stuffed into the first toothed end portion, while the first jacket is sheathed on the first toothed end portion,
the second multi-core optical fiber assembly comprises a second mating end used to be mated with the first mating end portion, a second optical fiber cable connected with the second mating end portion and a second optical fiber insulation layer sheathed on the second optical fiber cable,
the second sleeve unit comprises a second connecting tube, a second gasket, a second sealing ring and a second jacket, the second connecting tube connects the outer ring and has a second tube body, one end of the second tube body which is connected with the second jacket is formed with a second toothed end portion, and the second sealing ring is sheathed on the second optical fiber insulation layer and is stuffed into the second toothed end portion, while the second jacket is sheathed on the second toothed end portion.

5. The multi-core optical fiber connection device of claim 4, wherein the joint body is provided with an internal thread, and the first tube body is provided with an external thread cooperating with the internal thread to allow the joint body and the first connecting tube to be locked and fixed with each other,
the outer ring is provided with an internal thread, and the second tube body is provided with an external thread cooperating with the internal thread to allow the outer ring and the second connecting tube to be locked and fixed with each other.

6. The multi-core optical fiber connection device of any one of claim 1, wherein
the joint body is provided with an internal thread, the first sleeve unit comprises a first connecting tube, the first connecting tube connects the joint body and comprises a first tube body, and the first tube body is provided with an external thread cooperating with the internal thread to allow the joint body and the first connecting tube to be locked and fixed with each other,
the outer ring is provided with an internal thread, the second sleeve unit comprises a second connecting tube, the second connecting tube connects the outer ring and has a second tube body and the second tube body is provided with an external thread cooperating with the internal thread to allow the outer ring and the second connecting tube to be locked and fixed with each other.

* * * * *